US011310107B2

(12) United States Patent
Giust et al.

(10) Patent No.: US 11,310,107 B2
(45) Date of Patent: Apr. 19, 2022

(54) MULTI-ACCESS EDGE COMPUTING, MEC, SYSTEM AND METHOD FOR OPERATING THE SAME

(71) Applicant: NEC Laboratories Europe GmbH, Heidelberg (DE)

(72) Inventors: Fabio Giust, Costabissara (IT); Vincenzo Sciancalepore, Heidelberg (DE); Xi Li, Heidelberg (DE)

(73) Assignee: NEC LABORATORIES EUROPE GMBH, Heidelberg (DE)

( * ) Notice: Subject to any disclaimer, the term of this patent is extended or adjusted under 35 U.S.C. 154(b) by 0 days.

(21) Appl. No.: 17/253,148

(22) PCT Filed: Jun. 20, 2018

(86) PCT No.: PCT/EP2018/066481
§ 371 (c)(1),
(2) Date: Dec. 17, 2020

(87) PCT Pub. No.: WO2019/242856
PCT Pub. Date: Dec. 26, 2019

(65) Prior Publication Data
US 2021/0144057 A1 May 13, 2021

(51) Int. Cl.
*H04L 12/24* (2006.01)
*H04L 29/06* (2006.01)
(Continued)

(52) U.S. Cl.
CPC ...... *H04L 41/0806* (2013.01); *H04L 41/5006* (2013.01); *H04L 41/5009* (2013.01);
(Continued)

(58) Field of Classification Search
CPC ............ H04L 41/0806; H04L 41/5006; H04L 41/5009; H04L 63/0869; H04L 63/205; H04L 67/141; H04L 67/16
See application file for complete search history.

(56) References Cited

U.S. PATENT DOCUMENTS 9,143,508 B2 * 9/2015 Stinson, III ......... H04L 63/0876
9,967,350 B2 * 5/2018 Rao ......................... H04L 67/20
(Continued)

OTHER PUBLICATIONS

Lanfranco Zanzi et al., M/\2EC: A Multi-tenant Resource Orchestration in Multi-access Edge Computing, Conference Paper, Researchgate, Apr. 2017, pp. 1-6. (Year: 2017).*
T. Taleb, K. Samdanis, B. Mada, H. Flinck, S. Dutta and D. Sabella, "On Multi-Access Edge Computing: A Survey of the Emerging 5G Network Edge Cloud Architecture and Orchestration," in IEEE Communications Surveys & Tutorials, vol. 19, No. 3, pp. 1657-1681, 2017, doi: 10.1109/COMST.2017.2705720. (Year: 2017).*
(Continued)

*Primary Examiner* — Patrice L Winder
(74) *Attorney, Agent, or Firm* — Leydig, Voit & Mayer, Ltd.

(57) ABSTRACT

A method for operating a multi-access edge computing (MEC) system includes establishing, between two or more MEC providers, an agreement that defines mutual access policies that specify which MEC platforms and which MEC applications and/or services running on the MEC platforms are allowed to be exposed among each other and/or to other tenants. The MEC platforms are provisioned with appropriate configurations in accordance with the access policies of the agreement. A discovery process is executed for discovering a MEC platform within a MEC stack of another tenant and a communication link is established with the other tenant's MEC platform.

16 Claims, 5 Drawing Sheets

(51) Int. Cl.
  *H04L 29/08* (2006.01)
  *H04L 41/0806* (2022.01)
  *H04L 41/5006* (2022.01)
  *H04L 41/5009* (2022.01)
  *H04L 67/141* (2022.01)
  *H04L 67/51* (2022.01)

(52) U.S. Cl.
  CPC ........ *H04L 63/0869* (2013.01); *H04L 63/205* (2013.01); *H04L 67/141* (2013.01); *H04L 67/16* (2013.01)

(56) References Cited

U.S. PATENT DOCUMENTS

| | | | | |
|---|---|---|---|---|
| 10,200,543 | B2* | 2/2019 | Senarath | H04M 15/8033 |
| 10,349,240 | B2* | 7/2019 | Senarath | H04L 41/5029 |
| 10,411,964 | B2* | 9/2019 | Zhang | H04L 41/0806 |
| 10,506,489 | B2* | 12/2019 | Vrzic | H04W 36/26 |
| 10,594,516 | B2* | 3/2020 | Cidon | H04L 12/14 |
| 10,771,252 | B1* | 9/2020 | Teng | H04L 9/08 |
| 10,862,818 | B2* | 12/2020 | Senarath | H04W 72/1257 |
| 10,887,198 | B2* | 1/2021 | Giust | H04L 41/5054 |
| 2014/0052877 | A1* | 2/2014 | Mao | H04L 12/4641 709/245 |
| 2018/0317134 | A1* | 11/2018 | Leroux | H04W 24/02 |
| 2021/0157848 | A1* | 5/2021 | Doshi | G06F 16/907 |

OTHER PUBLICATIONS

I. Afolabi, T. Taleb, K. Samdanis, A. Ksentini and H. Flinck, "Network Slicing and Softwarization: A Survey on Principles, Enabling Technologies, and Solutions," in IEEE Communications Surveys & Tutorials, vol. 20, No. 3, pp. 2429-2453, 2018, doi: 10.1109/COMST.2018.2815638. (Year: 2018).*

"Next Generation Protocol (NGP); Scenario Definitions", ETSI Draft Specification; NGP 001, European Telecommunications Standards Institute (ETSI), 650, Route Des Lucioles; F-06921 Sophia-Antipolis; France, vol. ISG NGP Next Generation Protocols, No. V0.0.6, Feb. 17, 2017 (Feb. 17, 2017), pp. 1-124, XP014303246.

"Multi-access Edge Computing (MEC); MEC support for network slicing", ETSI Draft Specification; MEC 024, European Telecommunications Standards Institute (ETSI), 650, Route Des Lucioles; F-06921 Sophia-Antipolis; France, vol. ISG MEC Multi-access Edge Computing, No. V2.0.3, May 7, 2018 (May 7, 2018), pp. 1-15, XP014312187.

Aki Nakao: "5G Mobile Network R&D in Japan", ITU-T Draft; Study Period 2013-2016; Focus Group IMT-2020, International Telecommunication Union, Geneva, CH, vol. imt-2020, Jun. 8, 2015 (Jun. 8, 2015), pp. 1-48, XP044241887.

"Mobile Edge Computing (MEC); Mobile Edge Platform Application Enablement", ETSI Group Specification, European Telecommunications Standards Institute (ETSI), 650, Route Des Lucioles; F-06921 Sophia-Antipolis; France, vol. MEC, No. V1.1.1, Jul. 3, 2017 (Jul. 3, 2017), pp. 1-55, XP014290906.

* cited by examiner

ND EDGE COMPUTING, MEC,
MULTI-ACCESS EDGE COMPUTING, MEC, SYSTEM AND METHOD FOR OPERATING THE SAME

CROSS-REFERENCE TO PRIOR APPLICATIONS

This application is a U.S. National Phase Application under 35 U.S.C. § 371 of International Application No. PCT/EP2018/066481, filed on Jun. 20, 2018. The International Application was published in English on Dec. 26, 2019 as WO 2019/242856 under PCT Article 21(2).

STATEMENT REGARDING SPONSORED RESEARCH

The project leading to this application has received funding from the European Union's Horizon 2020 research and innovation programme under grant agreement No 761536.

FIELD

The present invention relates to a multi-access edge computing, MEC, system, as well as to a method for operating the same, wherein a physical infrastructure provider provides a physical infrastructure and wherein MEC providers are enabled to become tenants of the physical infrastructure provider by getting allocated network, computing and/or storage resources of the physical infrastructure to obtain their own MEC slices, wherein each of the MEC providers deploys its respective MEC slice to install and run distinct tenant MEC stacks, wherein each tenant MEC stack includes a MEC platform for installation of the respective tenant's MEC applications and/or services.

BACKGROUND

The stringent requirements of the fifth generation (5G) mobile services have fostered industry segments and standardization bodies operating within the mobile network context to extend computational capability to the edge of the networks. In particular, the European Telecommunications Standards Institute (ETSI) has formerly proposed the mobile edge-computing paradigm as the key-enabler to bring (programmable) network functions and general-purpose applications closer to the end-users. This has been further enhanced with the novel concept of Multi-access Edge Computing (MEC) to take into account heterogeneous access networks. It should be noted that in earlier documents of ETSI on this topic the MEC concept was denoted as Mobile Edge Computing.

In this context, virtualization and programmability play a fundamental role. Such technology enablers have led to the network slicing paradigm: Network functions can be virtualized across different network domains (e.g., access, transport and core) and may be dynamically chained to provide a "slice" of the network tailored to particular service requirements. To some extent, this concept has already been applied to MEC deployments.

SUMMARY

In an embodiment, the present invention provides a method for operating a multi-access edge computing (MEC) system in which a physical infrastructure provider provides a physical infrastructure and in which MEC providers are enabled to become tenants of the physical infrastructure provider by getting allocated network, computing and/or storage resources of the physical infrastructure to obtain their own MEC slices, wherein each of the MEC providers deploys its respective MEC slice to install and run distinct tenant MEC stacks, and wherein each tenant MEC stack includes a MEC platform for installation of the respective tenant's MEC applications and/or services. The method includes: establishing, between two or more of the MEC providers, an agreement that defines mutual access policies between the two or more of the MEC providers of the agreement, wherein the access policies specify which of the MEC platforms and which of the MEC applications and/or services running on the MEC platforms are allowed to be exposed among each other and/or to other tenants; provisioning the MEC platforms with appropriate configurations in accordance with the access policies of the agreement; and executing a discovery process for discovering one of the MEC platforms within one of the MEC stacks of one of the other tenants and establishing a communication link with the other tenant's MEC platform.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

While MEC slices can be efficiently created on a shared infrastructure (even a third-party-owned one) and offered as advanced services to network tenants (e.g., vertical segments, such as automotive or IoT industries, over-the-top applications or service providers), such slices are designed to work in isolation thereby exhibiting performance limitations. In other words, when two MEC slices (running on the same or on distinct physical infrastructure) need to communicate to each other, data must be conveyed through the full operator's core network, thereby completely losing the advantages brought by the MEC paradigm towards the edge of the network. Communication between MEC slices can be envisioned (but not limited to) as data plane exchange, application sharing, service exposure or coordination for dynamic resource sharing.

An exemplary instance of the problem arises when realizing vehicular networks with MEC support. In such scenario, exemplarily illustrated in FIG. 1, vehicles in a delimited area may be connected to the same radio access point (as per current RAN sharing deployments, as well as future network slicing deployments) but still subscribed to different communication service providers, thereby associated to different MEC platforms, that may happen to be co-located in the shared infrastructure to reduce costs. In this context it should be noted that in several RAN deployments, the real estate and part of the equipment are managed by a third party, which might not be the owner of radio spectrum licenses for cellular communications.

Figure 1:
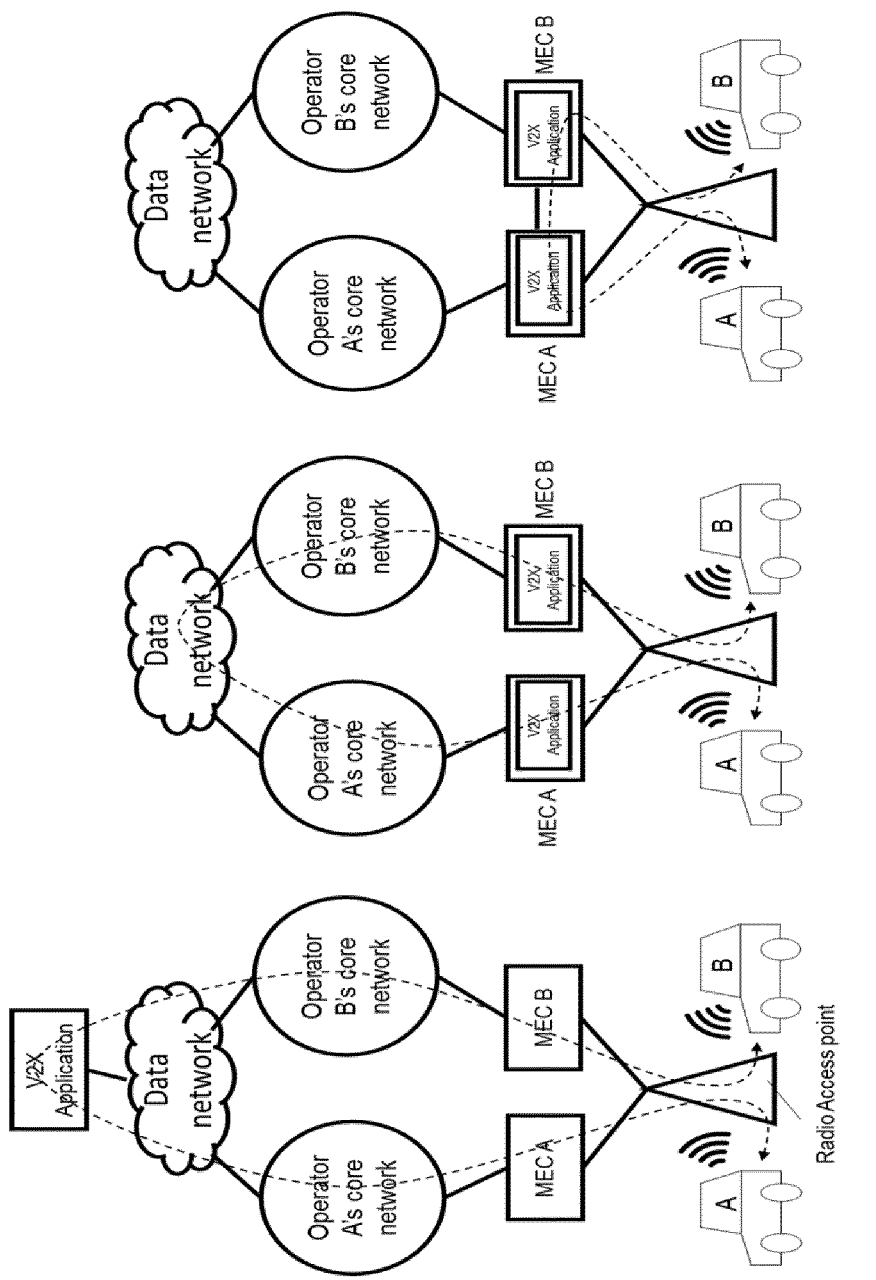
FIG. 1 is a schematic view illustrating a cross-domain MEC interaction scenario in vehicular communications.

In the automotive use cases, often vehicles must communicate to each other through a remote V2X application serving as mediator (shown in view a) of FIG. 1). Although the MEC paradigm allows to place such mediator application at the edge of the network (one application instance in each MEC deployment), without any cross-operator MEC communication, the data path still traverses the operators' core networks (as shown in view b) of FIG. 1), which results in the problem of high communication latency.

In an embodiment, the present invention provides a method for operating a multi-access edge computing, MEC, system in which a physical infrastructure provider provides a physical infrastructure and in which MEC providers are enabled to become tenants of the physical infrastructure provider by getting allocated network, computing and/or storage resources of the physical infrastructure to obtain their own MEC slices, wherein each of the MEC providers deploys its respective MEC slice to install and run distinct tenant MEC stacks, wherein each tenant MEC stack includes a MEC platform for installation of the respective tenant's MEC applications and/or services. The method includes establishing, among two or more of the MEC providers, an agreement that defines mutual access policies between the respective MEC providers of the agreement, wherein the access policies specify which MEC platforms and which of the MEC applications and/or services running on these MEC platforms are allowed to be exposed among each other and/or to other tenants. The method further includes provisioning the MEC platforms with appropriate configurations in accordance with the access policies of the agreement, and executing a discovery process for discovering a MEC platform within the MEC stack of another tenant and establishing a communication link with said other tenant's MEC platform.

In the context of the present invention, 'MEC provider', sometimes also denoted 'MEC service provider', 'MEC administrator' or, more generally, communication service provider (CSP), is used to refer to an entity that obtains a slice of infrastructure in order to run its MEC components on top. A MEC slice refers to the collection of infrastructure resources (including networking, computing and/or storage resources) allocated to run the MEC stack, i.e., the MEC software components, including the MEC platform and the MEC applications/services. As such, MEC slice and MEC stack may both refer to a CSP-owned system running over a shared infrastructure that belongs to another party, denoted 'infrastructure provider'.

In other words, a MEC provider/CSP owns the MEC stack and requests a MEC slice from the infrastructure provider, as the collection of networking, computing and/or storage resources necessary to run the MEC stack. After obtaining the MEC slice, the MEC provider/CSP becomes a "tenant" of the infrastructure provider.

Specifically, embodiments of the invention relate to a system to directly connect two or more independent MEC slices running on the same or different infrastructure and to realize a direct slice-to-slice data exchange over (shared) MEC physical platforms. Referring to the automotive use case illustrated in FIG. 1, embodiments of the invention can achieve a significantly reduced communication latency (compared to the scenario shown in view b) of FIG. 1) by enabling the application instances to interact with each other by means of a direct communication established between the MEC platforms (as schematically illustrated in view c) of FIG. 1). That is, embodiments of the invention solve the above-mentioned problem by providing a system architecture and a method to dynamically exchange data between the MEC slices, while keeping the high advantages of running MEC services and applications at the edge of the network.

Embodiments of the invention allow overcoming the isolation inherent to MEC systems when deployed as slices, so that a direct interaction can be enabled in order to optimize traffic routing, and allow service exposure among different tenant domains. To this end, embodiments relate to a method that augments the orchestration capabilities of the MEC system, as well as to a method that leverages the support from the infrastructure provider through a dedicated component which interacts with the MEC platforms that are running on that infrastructure. Embodiments of the invention also define a number of interfaces to allow direct communication between the MEC systems that belong to different tenant domains.

According to a specific embodiment, a method is provided for connecting different MEC slices without support of the infrastructure underneath, the method comprising the steps of:

negotiating the mutual access between two different OSS systems based on high-level policies, negotiating the operational procedures between MEC orchestrators to connect directly MEC platforms running on the same or different physical infrastructure, and implementing the communications via novel interfaces installed on different MEC orchestrators by means of data models described in Table 1 below.

According to an alternative embodiment, a method is provided for connecting different MEC slices with the support of the infrastructure underneath, the method comprising the steps of:

negotiating the mutual access between two different OSS systems based on high-level policies, negotiating the operational procedures between MEC platforms through a MEC platform registry provided by the infrastructure owner, and implementing the communications via novel interfaces installed on different MEC platforms by means of data models described in Table 2 below.

Figure 2:
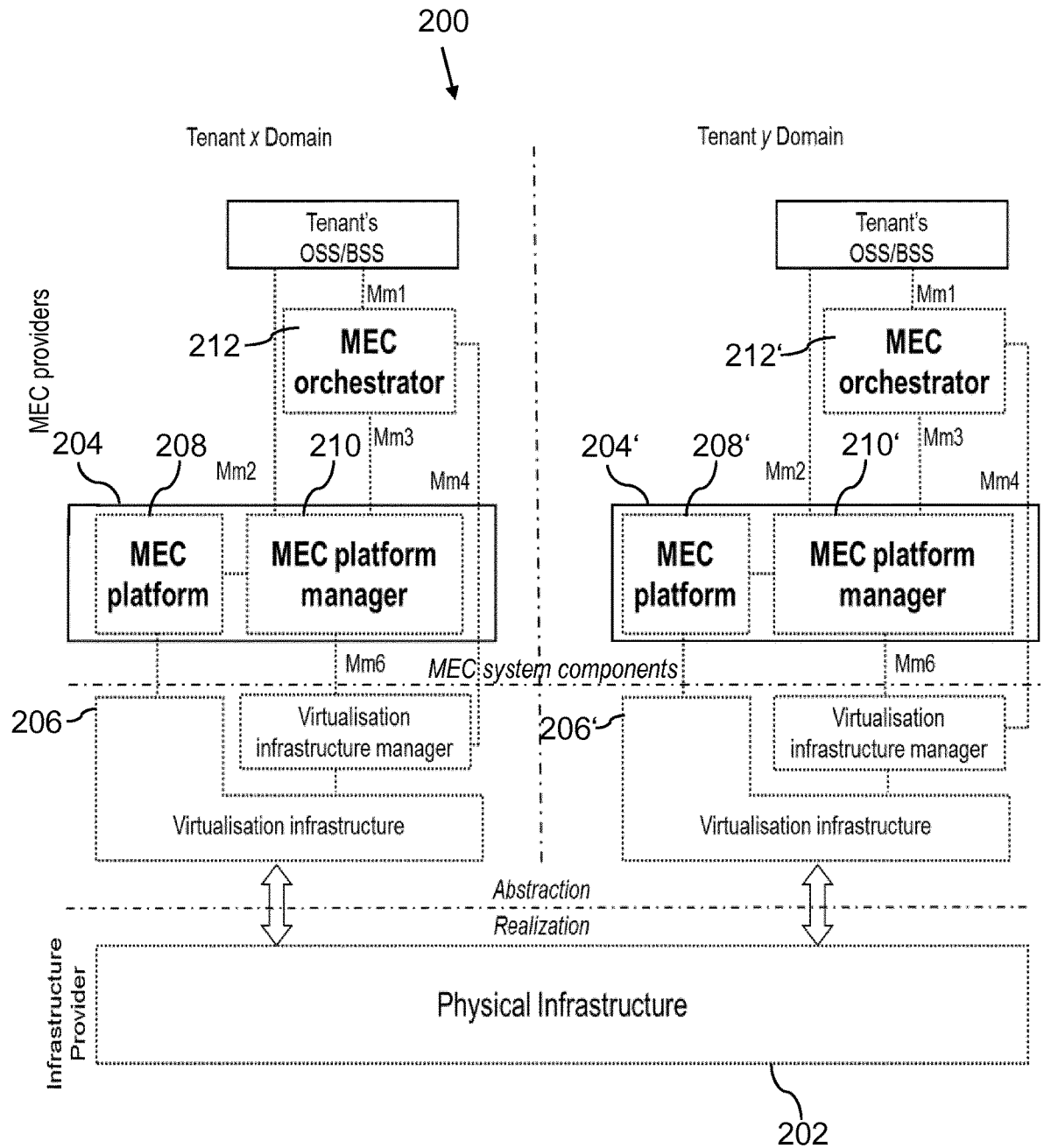
FIG. 2 is a schematic view illustrating an MEC deployment reference scenario including two MEC slices.

FIG. 2 illustrates a reference MEC system 200, in the prior art, which allows, e.g., over-the-top (OTT) services and third-party application and/or service providers, i.e. MEC tenants, to install and run their applications and/or services in an infrastructure provider's premises. With reference to the scenario shown in FIG. 2, two different tenants, denoted Tenant x and Tenant y, decide to get a slice of the physical infrastructure 202 in order to deploy (part of) their own MEC system. The shared physical infrastructure deployment 202 is the same and it is owned by the infrastructure provider.

The infrastructure provider is willing to guarantee isolation, but at the same time to increase the system resource efficiency and, in turn, to maximize the return of investment while exploiting the multiplexing gain. Specifically, physical resources are hardly split between the two tenants, and two distinct MEC stacks 204, 204' are installed onto virtualized environments 206, 206' facilitated by the infrastructure provider as an abstract representation of the physical infrastructure 202 by means of well-known virtualization mechanism. A MEC stack refers to the MEC equipment that runs at MEC host level, and it typically includes a MEC platform 208, 208', a MEC platform manager 210, 210', the MEC applications and MEC services. Such subsystem is interfaced with a MEC orchestrator 212, 212', which can be installed along with the MEC platform 208, 208' on the same infrastructure 202 or at another (remote) location.

In accordance with deployments in prior art (for reference, see ETSI GS MEC 003 V1.1.1 (2016-03), clauses 7.1.2, 7.1.4.1, and 7.1.5.1), the mobile edge orchestrator 212, 212', which is the core functionality in MEC system level management, may be configured to be responsible for the following functions:

maintaining an overall view of the MEC system 200 based on deployed MEC hosts, available resources, available MEC services, and topology;

on-boarding of application packages, including checking the integrity and authenticity of the packages, validating application rules and requirements and if necessary adjusting them to comply with operator policies, keeping a record of on-boarded packages, and preparing the virtualisation infrastructure manager(s) of the virtualization infrastructure 206, 206' to handle the applications;

selecting appropriate MEC host(s) for application instantiation based on constraints, such as latency, available resources, and available services;

triggering application instantiation, termination and as needed relocation, when supported.

The MEC platform manager 210, 210' may be configured to be responsible for the following functions:

managing the life cycle of applications including informing the MEC orchestrator 212, 212' of relevant application related events;

providing element management functions to the MEC platform 208, 208';

managing the application rules and requirements including service authorizations, traffic rules, DNS configuration and resolving conflicts;

receiving virtualised resources fault reports and performance measurements from the virtualisation infrastructure 206, 206' for further processing.

Finally, the MEC platform 208, 208' may be configured to be responsible for the following functions:

offering an environment where the MEC applications can discover, advertise, consume and/or offer MEC services, including, when supported, MEC services available via other platforms;

receiving traffic rules from the MEC platform manager 210, 210', applications, or services, and instructing the data plane accordingly;

receiving DNS records from the MEC platform manager 210, 210' and configuring a DNS proxy/server accordingly;

hosting MEC services;

providing access to persistent storage and time of day information.

FIG. 2 shows a reference scenario, where the MEC applications and MEC services are omitted for the sake of clarity; however, they can be considered part of the respective MEC platform 208, 208'.

MEC applications and MEC services are installed on the MEC stack 204, 204' along with the respective MEC platform 208, 208'. Thus, as depicted in FIG. 2 (indicated by the vertical chain dotted line), the MEC applications and services of Tenant x will not be shared with end-users (and applications) of MEC stack of Tenant y, as the physical infrastructure 202 guarantees isolation between those two instances of MEC slices. MEC stacks that share the same physical infrastructure are called herein neighbor MEC stacks, i.e. in the context of the scenario of FIG. 2 the MEC stacks 204, 204' are neighbor MEC stacks since they share physical infrastructure 202.

Embodiments of the present invention aim at enabling a direct communication between MEC applications running in neighbor MEC stacks. Specifically, 'direct' communication is meant to refer to a shortest path communication with no further GTP (GPRS Tunneling Protocol) processing. Moreover, embodiments of the invention aim at enabling an application that is running in one MEC stack to use a service that is available in a neighbor MEC stack.

Ultimately, when two or more neighbor MEC stacks are enabled to communicate as per the mechanisms above, in particular by means of supporting operations in form of sharing of DNS and traffic rules and exposing services among platforms, the MEC platforms will appear as one from the perspective of the MEC applications, but still MEC providers can retain control over each of their MEC stack.

Still with reference to FIG. 2, the following steps are executed according to an embodiment, in order for the MEC stack 204 of Tenant x to interact with the neighbor MEC stack 204' of Tenant y:

First, a business-level agreement is established between the MEC providers. Such agreement is assumed to be negotiated at OSS/BSS level. The agreement should contain a number of policies that specify one or more of the following issues:

a) The agreement may contain policies that specify which MEC platforms are allowed to be exposed among the parties. In this context, these policies may also contain means to identify those MEC platforms that can be exposed, e.g. through the MEC platform's ID and/or an URI.

b) The agreement may contain policies that specify which MEC services are allowed to be exposed among the parties. In this context, these policies may also contain means to identify those MEC services can be exposed, e.g., through the MEC service instance's ID and/or URI.

c) The agreement may contain information and/or regulations with respect to the accessibility of DNS records, traffic rules and/or other configuration parameters that are needed to create a communication link between MEC platforms over a reference point (e.g., the—suitably adapted—Mp3 reference point already mentioned in ETSI MEC ISG, Mobile Edge Computing (MEC); Framework and reference architecture, ETSI, DGS MEC 003, April 2016). In this context it should be noted that in the above ETSI specification the communication reference point between MEC platforms is limited to: "The Mp3 reference point between MEC platforms is used for control communication between MEC platforms".

d) The agreement may further contain QoS-related parameters, e.g., a guaranteed bandwidth in a communication link between platforms.

In a next step, the MEC platforms 208, 208' can be provided with appropriate configurations that fit the above agreement between the MEC providers.

Furthermore, the functional operations that MEC entities need to perform in order to carry out the nature of the agreement can be defined. More specifically, the communication channels between MEC stacks (i.e. between MEC stacks 204, 204' in the exemplary scenario of FIG. 2), e.g., through MEC platform discovery, can be established once the systems of the tenants (i.e. of Tenant x and Tenant y in the exemplary scenario of FIG. 2) are duly configured.

Hereinafter, two different embodiments will be described to implement the above steps of MEC platform configuration and definition of MEC entities' functional operations. An implementation according to the first embodiment, described below in connection with FIG. 4, can be regarded as a communication setup without infrastructure support, while an implementation according to the second embodiment, described below in connection with FIG. 5, can be regarded as a communication setup with infrastructure support.

Figure 3:
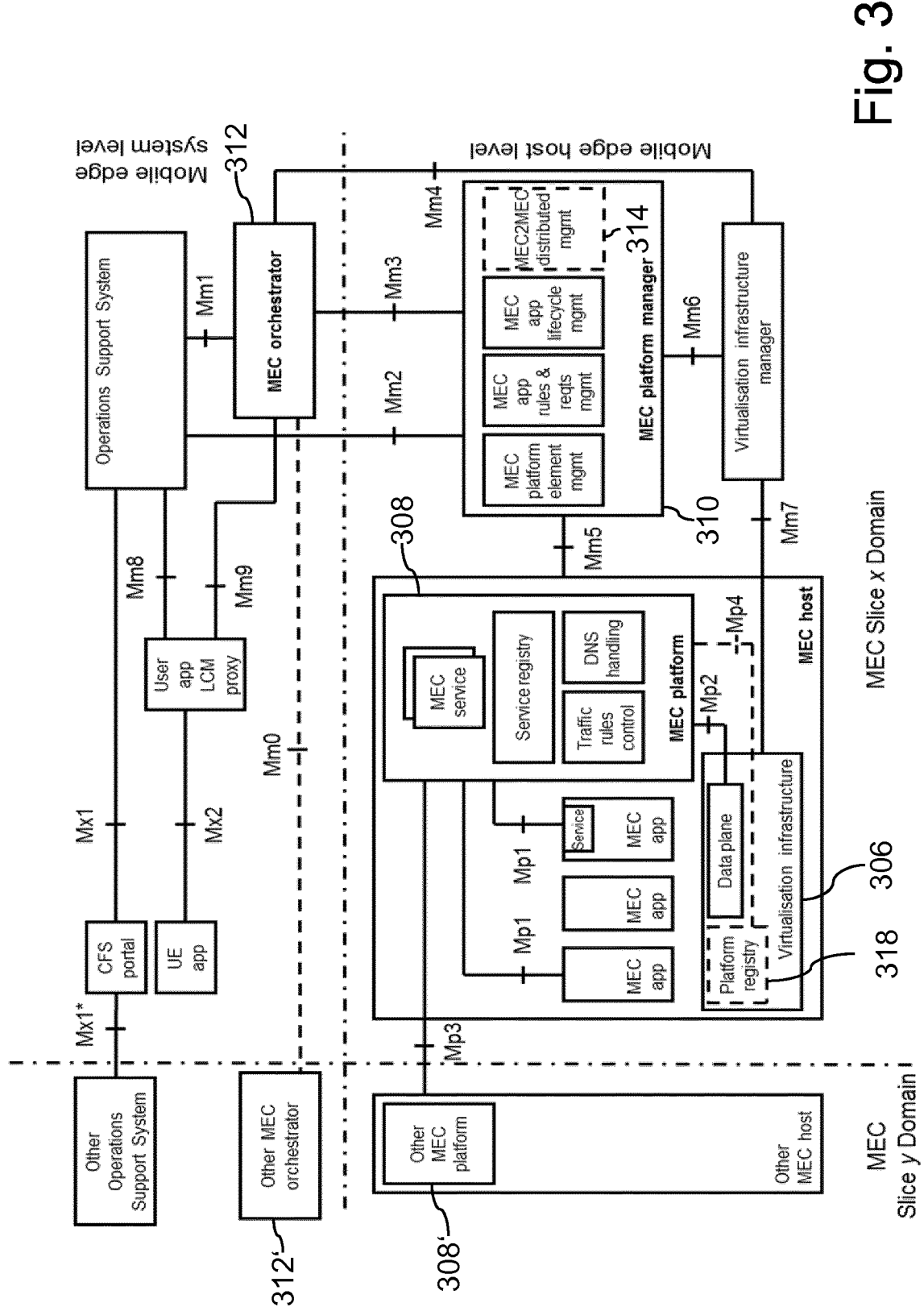
FIG. 3 is a schematic view illustrating an MEC architecture enhancement for MEC-to-MEC support in accordance with embodiments of the present invention.

Both embodiments include extensions to the current MEC architecture and the amended MEC architecture is depicted in FIG. 3.

As already mentioned above and as shown in FIG. 3, the physical infrastructure provides a virtualized environment 306 wherein tenants can install the entire MEC stack and run their own services/applications. In the first embodiment described herein, i.e. the embodiment without infrastructure support, such infrastructure does not provide any further artifact or mechanism to facilitate the interaction between MEC stacks.

This way, each MEC administrator, herein also named MEC provider, must provision its own system with appropriate configuration parameters that indicate the identifier(s) and/or address(es) of the respective other MEC platform(s) (e.g., its (their) URI(s) and IP addresses). In order to fill the right values in such parameters, a discovery procedure is executed, which can take place either at OSS/BSS level, or between the MEC orchestrators 312, 312'.

According to an embodiment of the invention, a new reference point is provided, namely Mm0, between MEC orchestrators 312, 312', together with the logic required to execute and interpret the operations upon such reference point.

Moreover, according to an embodiment of the invention, a new function is implemented and configured within the MEC platform manager 310. This function, denoted with reference 314 and termed "MEC2MEC distributed mgmt" herein, is configured to get the local instructions from the MEC orchestrator 312, and it will instruct the MEC platform 308 to expose certain applications/services/data to a neighbor tenant's MEC platform 308' by means of reference point Mp3.

Ultimately, the objective is to setup the Mp3 reference point as an MEC-to-MEC communication channel. According to the first embodiment, i.e. communication setup without infrastructure support, this objective is achieved by implementing a process as illustrated in FIG. 4, which will now be described in greater detail.

Figure 4:
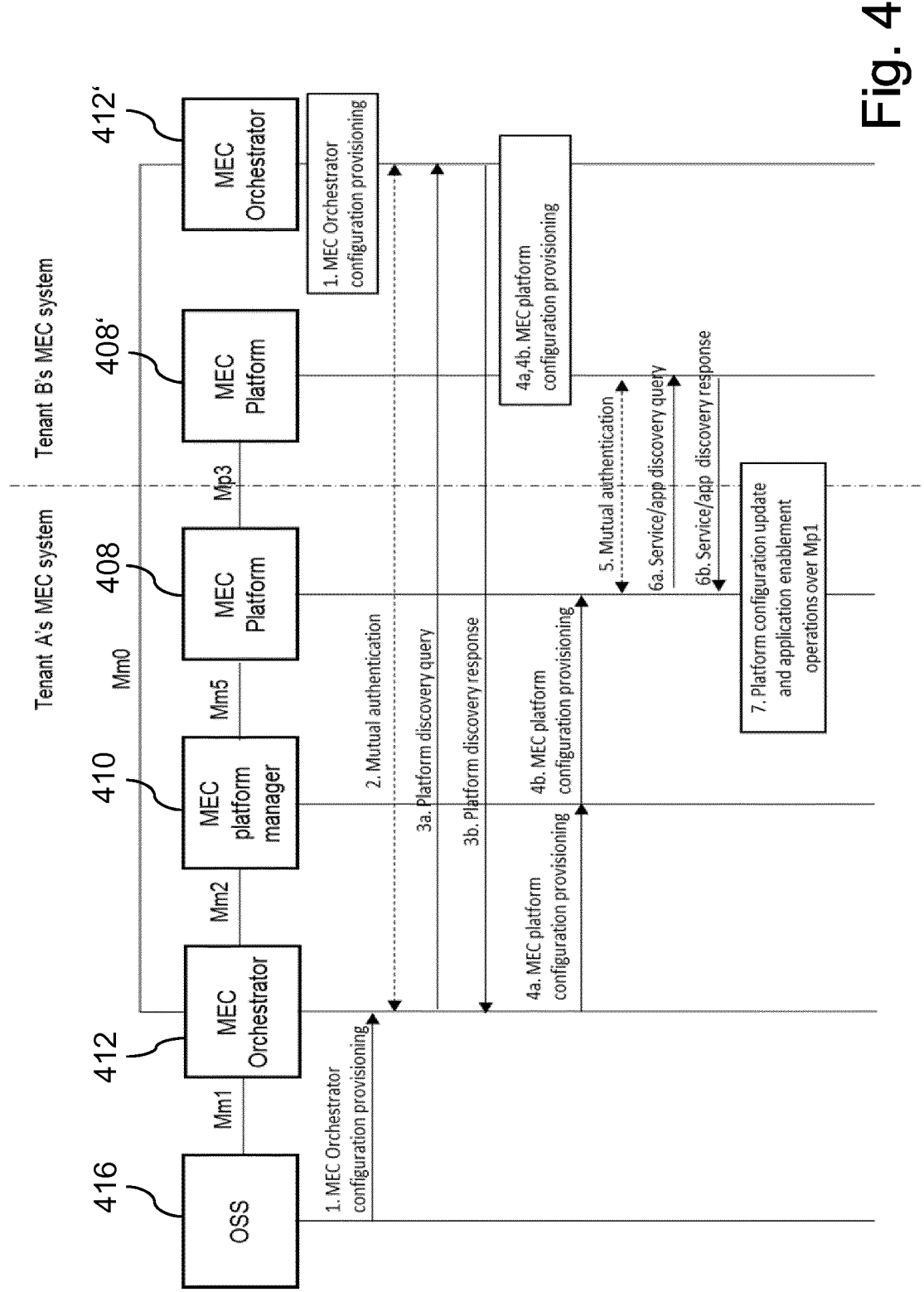
FIG. 4 is a message sequence diagram illustrating message exchange between the relevant entities in the context of an MEC-to-MEC communication setup without infrastructure support in accordance with an embodiment of the present invention.

After Tenant A has reached a business level agreement with another tenant, denoted Tenant B in FIG. 4, the OSS 416 of Tenant A provides appropriate configuration parameters via Mm1 reference point to the MEC orchestrator 412 (shown at step 1 in FIG. 4). Depending on the concrete implementation, these configuration parameters transmitted to MEC orchestrator 412 may include one or more of the attributes shown Table 1 below. As will be appreciated by those skilled in the art, the configuration parameters may include all attributes shown in Table 1 and may even include additional attributes not shown in Table 1. In Table 1, the qualifiers 'M' and 'O' denote mandatory attributes and optional attributes, respectively, and the citation [MEC 011] refers to document ETSI MEC ISG, *Mobile Edge Computing* (MEC); *Mobile Edge Platform Application Enablement*," ETSI, DGS MEC 011, July 2017. The cited clause 6.2.2 of this document is incorporated herein by way of reference.

TABLE 1

Attributes used to provision the MEC-to-MEC configuration without infrastructure support

| Attribute name | Qualifier | Cardinality | Data type | Description |
|---|---|---|---|---|
| PeerOchestratorID | M | 0 . . . N | URI | Indicates the MEC Orchestrator associated to the neighbour tenant. |
| AuthenticationMethod | M | 1 | structured | Indicates the authentication method to be used, e.g. based on credentials exchange and includes the necessary attributes. |
| MultiPlatformExchange Profile | M | 1 . . . N | structured | Contains the attributes below that characterize a partner tenant |
| >TenantID | M | 1 | String | Identifies the MEC system's provider |
| >direction | M | 1 | Enumeration | Defines if the tenant is granted access, offers access or both to the resources |
| >ServiceInfo | O | 0 . . . N | Structured | This type represents the general information of a MEC service and it is defined as a subset of attributes from the data type in [MEC 011] clause 6.2.2. |
| >>serName | M | 1 | String | The name of the service. This is how the service producing MEC application identifies the service instance it produces (see [MEC 011] clause 6.2.2). |
| >>serCategory | O | 0 . . . 1 | CategoryRef | A Category reference. (The category resource is used to group |

TABLE 1-continued

Attributes used to provision the MEC-to-MEC configuration without infrastructure support

| Attribute name | Qualifier | Cardinality | Data type | Description |
| --- | --- | --- | --- | --- |
| | | | | product offerings, service and resource candidates in logical containers. Categories may contain other categories and/or product offerings, resource or service candidates.) (see [MEC 011] clause 6.2.2) For the serCategory, the example values include: 1. "RNI" 2. "Location" 3. "Bandwidth Management" |
| >>version | M | 1 | String | The version of the service (see [MEC 011] clause 6.2.2). |

Although not explicitly shown in FIG. 4, it should be noted that the same step (with the same or with similar configuration parameters) will be executed by the other part of the agreement, i.e. by Tenant B.

As shown at step 2 of FIG. 4, the MEC orchestrator 412, upon receiving the address/URI of its peer, i.e. MEC orchestrator 412' of Tenant B's MEC stack, starts a mutual authentication process with it. All the authentication procedures invoked by the system and methods according to embodiments of the present invention can be implemented choosing state of the art mechanisms. Hence, a detailed description of the authentication procedure is omitted herein.

After successful authentication, the MEC orchestrator 412 queries the addresses/URIs of the neighbor's MEC platform 408', shown as 'platform discovery query' in step 3a of FIG. 4. The MEC orchestrator 412' of Tenant B's MEC stack responds to this query with a respective 'platform discovery response' (step 3b of FIG. 4).

As shown in step 4, the MEC orchestrator 412 provides configuration parameters to the MEC platform 408. The parameters may be provided to the MEC platform 408 through the 'MEC2MEC distributed mgmt' function (depicted in FIG. 3) within the MEC platform manager 410. The parameters may include at least the MultiPlatformExchangeProfile attribute (see Table 1) of the neighbor tenant and the MEC platform's 408' address/URI associated to tenant B (which was obtained in step 3).

The MEC platform 408, upon receiving the address/URI of its peer, i.e. of MEC platform 408', starts a mutual authentication process with it, as shown at step 5 of FIG. 4. Again, since those skilled in the art are sufficiently familiar with authentication procedures, a detailed description of this authentication procedure is omitted herein.

After successful authentication, the MEC platform 408 queries the addresses/URIs of the services and/or applications available at the neighbor's MEC platform 408'. This may be performed in a similar way as specified in ETSI MEC ISG, *Mobile Edge Computing (MEC); Mobile Edge Platform Application Enablement*, ETSI, DGS MEC 011, July 2017, in particular in sections 5.2.4 and 5.2.5, which are incorporated herein by way of reference.

In order to reduce the message overhead and to speed up the overall transaction, the query message (shown at 6a) may contain the addresses/URIs of the local services/applications that can be exposed to the peer, as well as additional parameters for DNS records and traffic rules (e.g., for NAT traversal). Similarly, the response (shown at 6b) may contain (e.g. piggybacked) additional parameters.

It shall be noted that, under some circumstances, steps 5 and 6 can be merged with step 3, that is, the MEC platforms' 408, 408' mutual authentication and service discovery may take place between MEC orchestrators 412, 412', provided sufficient capabilities are implemented by the orchestrators 412, 412'. The scheme described above is configured to allow keeping some status information at platform level, thereby relaxing the complexity of the orchestrators 412, 412', and also enables the platform 408 to make local decisions of sharing/allowing services with other platforms 408', which can be useful under some circumstances, e.g., overload.

In any case, i.e. independent of how service discovery has actually been executed, the acquired information is used to update the local configuration of the MEC platform 408, as shown at step 7.

After the successful completion of the procedure above, two MEC platforms from different tenants (i.e., in the scenario of FIG. 4, MEC platform 408 of Tenant A and MEC platform 408' of Tenant B) are enabled to interact, e.g., to route traffic between applications sitting in the two different stacks.

It should be noted that the embodiment described above in connection with FIG. 4 also covers the scenario in which different MEC stacks are enabled to interact even when they are not neighbors, i.e., not sharing the same physical infrastructure.

Figure 5:
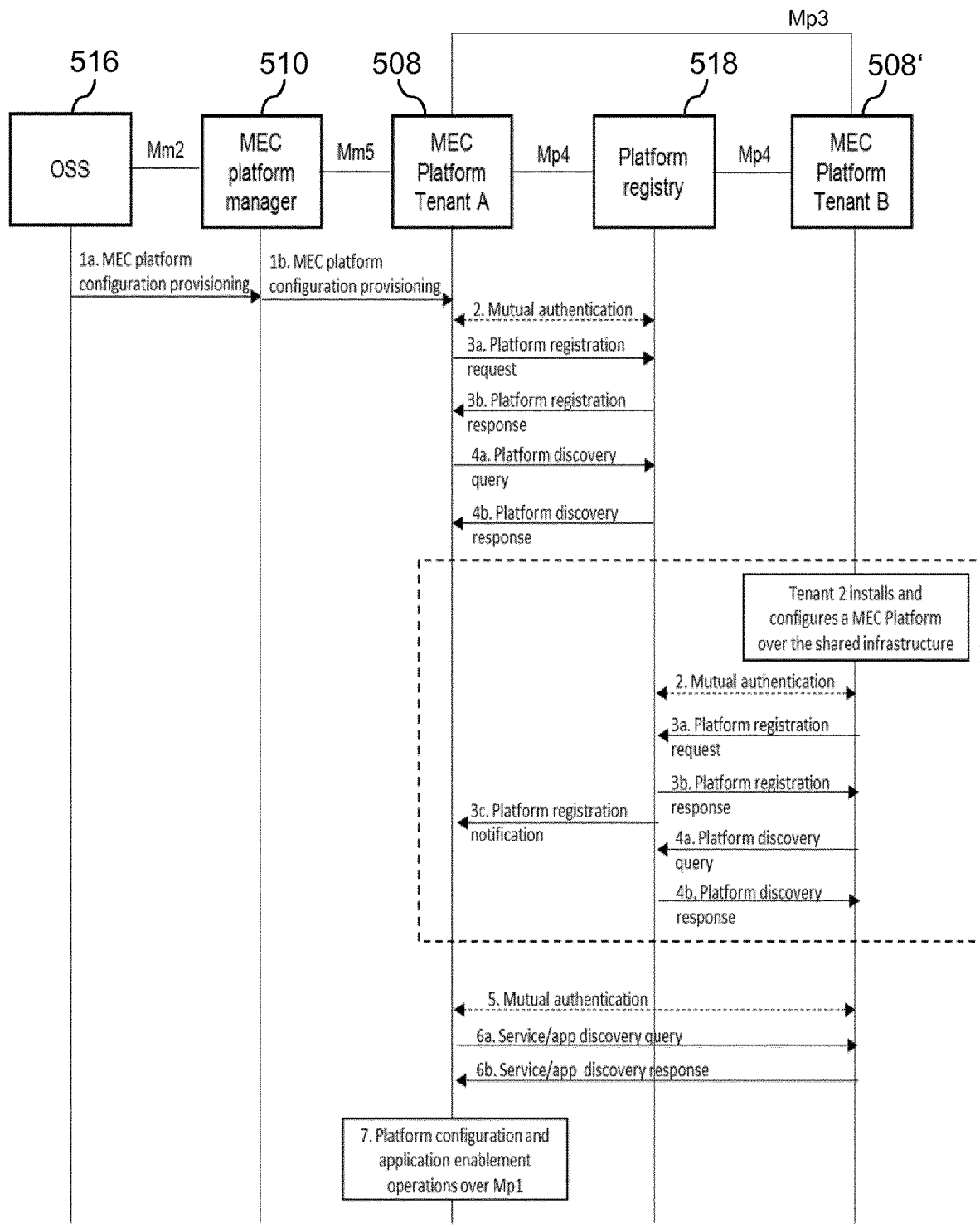
FIG. 5 is a message sequence diagram illustrating message exchange between the relevant entities in the context of an MEC-to-MEC communication setup with infrastructure support in accordance with an embodiment of the present invention.

FIG. 5 is a message sequence diagram illustrating message exchange between the relevant entities in the context of an MEC-to-MEC communication setup with infrastructure support in accordance with the above-mentioned second embodiment of the present invention.

In this embodiment, the slice-to-slice interaction leverages on the support of the infrastructure underneath, which is achieved by the introduction of a logical component, termed 'platform registry' herein and denoted with reference 318 in FIG. 3 and with reference 518 in FIG. 5. The platform registry 318, 518 is a functional block present in the virtualization infrastructure underpinning the MEC stack, as shown in FIG. 3.

In an embodiment, the platform registry 318, 518 is an entity that is working as a rendezvous-point among different neighbor MEC stacks in order to enable their automatic discovery and interaction. A new reference point is introduced, denoted Mp4 in FIG. 3, wherein the platform registry 318, 518 interacts with the respective MEC platform 308 through interfaces conveyed over this reference point Mp4.

With reference to FIG. 5, MEC orchestrators do not need to communicate directly (i.e. through the Mm0 reference point, as described in connection with FIG. 4), since the MEC platforms 508, 508' can discover each other through the platform registry entity 518. To this end, the ME2ME distributed mgmt functions of the respective MEC stacks are configured directly by the respective OSS, as will be described in greater detail below.

According to the two specifications i) ETSI MEC ISG, *Mobile Edge Computing (MEC); Framework and reference architecture*, ETSI, DGS MEC 003, April 2016, and ii) ETSI MEC ISG, *Mobile Edge Computing (MEC); Mobile Edge Management; Part 1; System, host and platform management*", ETSI, DGS MEC 010-1, the MEC platform configuration is made by the OSS through the MEC platform manager using Mm2 reference point, and the MEC platform manager enforces such parameters to the MEC platform via Mm5. Thus, the business level agreements between tenants are converted into policies implemented by the configuration parameters that shall be enforced in the platform, using the information flow described below in connection with FIG. 5.

Tenant A configures the MEC platform in order to leverage the support from the shared infrastructure. The configuration is executed via the Mm2 reference point (shown as step 1a in FIG. 5) and the Mm5 reference point (step 1b).

The configuration shall convey one or more of the attributes shown in Table 2 below. As will be appreciated by those skilled in the art, the configuration parameters may include all attributes shown in Table 2 and may even include additional attributes not shown in Table 2. Again, like in Table 1, the citation [MEC 011] refers to document ETSI MEC ISG, *Mobile Edge Computing (MEC); Mobile Edge Platform Application Enablement*," ETSI, DGS MEC 011, July 2017.

TABLE 2

Attributes used to provision the MEC-to-MEC configuration with infrastructure support

| Attribute name | Qualifier | Cardinality | Data type | Description |
|---|---|---|---|---|
| PlatformRegistry | M | 1 | | Contains the sub-attributes below |
| >PlatformRegistryId | M | 1 | URI | Identifies the Platform Registry that a MEC platform shall use |
| >MECPlatformID | M | 1 . . . N | URI | Identifies the MEC platforms allowed to register to the Platform Registry |
| >AuthenticationMethod | M | 1 | structured | Indicates the authentication method to be used. |
| MultiPlatformExchangeProfile | M | 1 . . . N | structured | Contains the attributes below that characterize a partner tenant |
| >TenantID | M | 1 | String | Identifies the MEC system's provider |
| >direction | M | 1 | Enumeration | Defines if the tenant is granted access, offers access or both to the resources |
| >ServiceInfo | O | 0 . . . N | Structured | This type represents the general information of a MEC service and it is defined as a subset of attributes from the data type in [MEC 011] clause 6.2.2. |
| >>serName | M | 1 | String | The name of the service. This is how the service producing MEC application identifies the service instance it produces (see [MEC 011] clause 6.2.2). |
| >>serCategory | O | 0 . . . 1 | CategoryRef | A Category reference. (The category resource is used to group product offerings, service and resource candidates in logical containers. Categories may contain other categories and/or product offerings, resource or service candidates.) (see [MEC 011] clause 6.2.2) For the serCategory, the example values include: 1. "RNI" 2. "Location" 3. "Bandwidth Management" |
| >>version | M | 1 | String | The version of the service (see [MEC 011] clause 6.2.2). |

Once configured, the MEC platform 508 of Tenant A authenticates itself towards the shared infrastructure's platform registry 518, as shown at the step 2. It should be noted that the platform registry's 518 URI was obtained through the configuration in step 1.

In a next step, the MEC platform 508 registers at the platform registry 518. This happens by exchanging control messages over the Mp4 reference point.

In the registration request, shown at step 3a, the MEC platform 508 announces its ID to the platform registry 518. The registration request also includes a list of other tenants' MEC platforms that are authorized to access the MEC platform 508. In the illustrated scenario this list is assumed to contain Tenant B's MEC platform 508'. In addition, the list contains the set of services and applications than can be exposed to other MEC platforms. In this context it should be noted that in case of piggybacked authentication, the request message 3a may contain means to authenticate the MEC platform 508 towards the platform registry 518.

In the registration response, shown at step 3b, the platform registry 518 acknowledges the registration or denies the registration, e.g. by sending an appropriate error message. In case of successful registration, the platform registry 518 may configure the response message 3b to contain a list of other MEC platforms already present in the system, which the tenant A is authorized to access. For each platform, the list of exposed services and applications may also be included within the response message 3b. In this context it should again be noted that in case of piggybacked authentication, the response message 3b may contain means to authenticate the platform registry 518 towards the MEC platform 508.

Should another MEC platform be installed in the system, this MEC platform may perform the registration and discovery procedures described above. In the embodiment illustrated in FIG. 5, this is shown for Tenant B's MEC platform 508' that likewise executes steps 2, 3a and 3b, as indicated in the dotted line box in FIG. 5. After a successful registration, the platform registry 518 may send a platform registration notification to all the MEC platforms that can access the newly installed one. In the embodiment illustrated in FIG. 5, the platform registry 518 sends such notification regarding the registration of Tenant B's MEC platform 508' to Tenant A's MEC platform 508 (step 3c). This platform registration notification is configured to also include a list of the exposed services and/or applications, i.e. of the services and/or applications the respective MEC platform is willing to make available for being used by other MEC platforms or tenants.

Once successfully registered, the MEC platform 508 may start a MEC platform discovery procedure over Mp4 reference point, as shown at step 4. In the framework of this discovery procedure the MEC platform 508 sends a platform discovery query to the platform registry 518 (step 4a) and, in return, the platform registry 518 sends a platform discovery response (step 4b) including a list of other MEC platforms (e.g., their URI) that are already present in the system and which the tenant is authorized to access. For each of those MEC platforms, the platform discovery response also includes a list of exposed services and/or applications.

As will be appreciated by those skilled in the art, step 4 may be omitted in case the list of other MEC platforms (registered and available, i.e. placed at Tenant A's disposal) is sent during the registration phase as per step 3b.

A MEC platform, upon discovering the presence of other MEC platforms, authenticates itself against those ones that it is authorized to communicate with. In the embodiment illustrated in FIG. 5, MEC platform 508, after having being notified of the presence of MEC platform 508' by means of platform registration notification 3c, performs a mutual authentication process with MEC platform 508', as shown at step 5.

After authentication, i.e. after successfully terminating step 5, Tenant A's MEC platform 508 sends a service/application discovery query message to the peer MEC platform 508' (step 6a) in order to discover the services and/or applications (e.g., their URI) that can be accessed by the requesting platform. In return, the solicited MEC platform, i.e. Tenant B's MEC platform 508' in the embodiment of FIG. 5, responds with a list of services and/or applications (e.g., their URI) that can be accessed by the requesting MEC platform 508 (step 6b).

After obtaining the list of services and applications available through other platforms (i.e. MEC platform 508' in the embodiment of FIG. 5), the requesting platform (i.e. MEC platform 508 in the embodiment of FIG. 5), updates its service registry, DNS database and performs application enablement procedures as required, following the standard procedures defined in ETSI MEC ISG, *Mobile Edge Computing (MEC)*; *Mobile Edge Platform Application Enablement*, ETSI, DGS MEC 011, July 2017.

Advantages and advancements achieved by embodiments of the present invention include:
1. Connecting directly different MEC slices running on the same or different physical infrastructure by enabling services and applications exposure based on management policy rules, by means of
   a. Establishing the connection between different MEC slices by overpassing the isolation inherent to the MEC slices (e.g., global vs. local URI address and NAT traversal);
   b. Discovering different MEC platforms running on different slices by means of interaction between the MEC orchestrators that control the platforms within the slices; and/or
   c. Discovering different MEC platforms running on different slices by means of a platform registry installed on the virtualized infrastructure that interacts directly with all MEC platforms.
2. Extending the ETSI MEC Mp3 reference point to convey the direct communication between MEC slices.
3. Introducing a Mm0 reference point in the ETSI MEC architecture between MEC orchestrators and the logic to execute the corresponding interfaces.
4. Introducing a Mp4 reference point in the ETSI MEC architectures between the MEC platform and the Virtualized infrastructure and the logic to execute the corresponding interfaces.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a multi-access edge computing (MEC) system in which a physical infrastructure provider provides a physical infrastructure and in which MEC providers are enabled to become tenants of the physical infrastructure provider by getting allocated network, computing and/or storage resources of the physical infrastructure to obtain their own MEC slices, wherein each of the MEC providers deploys its respective MEC slice to install and run distinct tenant MEC stacks, wherein each tenant MEC stack includes a MEC platform for installation of the respective tenant's MEC applications and/or services, the method comprising:
establishing, between two or more of the MEC providers, an agreement that defines mutual access policies between the two or more of the MEC providers of the agreement, wherein the access policies specify which of the MEC platforms and which of the MEC applications and/or services running on the MEC platforms are allowed to be exposed among each other and/or to other tenants,
provisioning the MEC platforms with appropriate configurations in accordance with the access policies of the agreement, and
executing a discovery process for discovering one of the MEC platforms within one of the MEC stacks of one of the other tenants and establishing a communication link with the other tenant's MEC platform.

2. The method according to claim 1, wherein the agreement is negotiated at the MEC providers' Operations Support System/Business Support System (OSS/BSS) level.

3. The method according to claim 1, wherein the agreement includes an exchange of information on an identity of the MEC platforms that are allowed to be exposed to other tenants, together with information on the identity of the MEC applications and/or services running on these MEC platforms that are allowed to be exposed to other tenants including the MEC platform's identifier (ID) and/or uniform resource identifier (URI) and/or the MEC application and/or service instance's ID and/or URI.

4. The method according to claim 1, wherein:
the agreement contains policies that specify accessibility to Domain Name System (DNS) records, traffic rules and configuration parameters for creating the communication link between MEC platforms, and/or
the agreement contains policies that specify Quality of Service (QoS)-related parameters to be guaranteed in the communication link between MEC platforms.

5. The method according to claim 1, wherein the communication link between different tenants' MEC platforms is established via a MEC Mp3 reference point.

6. The method according to claim 1, wherein the discovery process is executed either between the tenant MEC stacks at Operations Support System/Business Support System (OSS/BSS) level or among MEC orchestrators that interface with the tenant MEC stacks.

7. The method according to claim 1, wherein a MEC orchestrator, upon receiving the address and/or uniform resource identifier (URI) of a further MEC orchestrator, executes a mutual authentication process with the further MEC orchestrator.

8. The method according to claim 7, wherein the MEC orchestrator, after successful authentication, queries the address and/or URI of the MEC platform of the further MEC orchestrator.

9. The method according to claim 8, wherein the MEC orchestrator provides the obtained address and/or URI of the MEC platform of the further MEC orchestrator to its own MEC platform through a dedicated function implemented within an associated MEC platform manager.

10. The method according to claim 1, wherein a MEC platform registry is used as a rendezvous point among the MEC platforms of a shared infrastructure in order to enable their automatic discovery and interaction.

11. The method according to claim 10, wherein the MEC platform registry, upon receiving a registration from a newly installed MEC platform that is newly installed in the MEC system, sends a platform registration notification, including a list of exposed MEC applications and/or services, to all existing ones of the MEC platforms that can access the newly installed MEC platform.

12. A multi-access edge computing (MEC) system, comprising:
a physical infrastructure of a physical infrastructure provider,
a plurality of MEC providers that are enabled to become tenants of the physical infrastructure provider by getting allocated network, computing and/or storage resources of the physical infrastructure to obtain their own MEC slices,
wherein each of the MEC providers is configured to deploy its respective MEC slice to install and run distinct tenant MEC stacks, wherein each tenant MEC stack includes a MEC platform for installation of the respective tenant's MEC applications and/or services,
wherein two or more of the MEC providers of the plurality of MEC providers are configured to establish an agreement among each other that defines mutual access policies between the two or more of the MEC providers of the agreement, wherein the access policies specify which of the MEC platforms and which of the MEC applications and/or services running on the MEC platforms are allowed to be exposed among each other and/or to other tenants,
communication means for provisioning the MEC platforms with appropriate configurations in accordance with the access policies of the agreement, and
at least one of a tenant MEC stack or a MEC orchestrator that interfaces with the tenant MEC stack being configured to execute a discovery process for discovering one of the MEC platforms within one of the MEC stacks of one of the other tenants and to establish a communication link with the other tenant's MEC platform.

13. The MEC system according to claim 12, wherein the MEC system comprises the MEC orchestrator that interfaces with the tenant MEC stack, the MEC system further comprising a reference point provided between the MEC orchestrator that interfaces with the tenant MEC stack and a further MEC orchestrator of another one of the tenant MEC stacks whose MEC platform is a neighbor, the reference point being configured for exchanging addresses and/or Uniform Resource Identifiers (URIs) between the respective MEC orchestrators.

14. The MEC system according to claim 12, wherein the MEC system comprises the MEC orchestrator that interfaces with the tenant MEC stack, the MEC system further comprising a function implemented within a MEC platform manager of the tenant MEC stacks, the function being configured to:
- receive configuration parameters from the MEC orchestrator that interfaces with the tenant MEC stack, including at least an identifier of a neighbor tenant and an address and/or Uniform Resource Identifier (URI) of the neighbor tenant's MEC platform, and
- instruct the MEC platform of the tenant MEC stack associated with the MEC orchestrator to expose certain MEC applications and/or services running on the MEC platform to the neighbor tenant's MEC platform by a reference point Mp3.

15. The MEC system according to claim 12, further comprising a logical component installed on a shared infrastructure, wherein the logical component is a MEC platform registry being configured to act as a rendezvous point among the MEC platforms of the shared infrastructure in order to enable their automatic discovery and interaction.

16. The MEC system according to claim 15, further comprising a reference point provided between the platform registry and the MEC platforms, the reference point being configured for exchanging control messages for registering of MEC platforms at the platform registry.

* * * * *